(12) United States Patent
Geels et al.

(10) Patent No.: US 9,085,701 B2
(45) Date of Patent: Jul. 21, 2015

(54) PRIMER COMPOSITION

(71) Applicants: Gerard Geels, Hoorn (NL); Michel Gillard, Louvain-la-Nevue (BE); Albert Dirk Broek, Leiderdorp (NL)

(72) Inventors: Gerard Geels, Hoorn (NL); Michel Gillard, Louvain-la-Nevue (BE); Albert Dirk Broek, Leiderdorp (NL)

(73) Assignee: PPG B.V., Uithoorn (NL)

( * ) Notice: Subject to any disclaimer, the term of this patent is extended or adjusted under 35 U.S.C. 154(b) by 0 days.

(21) Appl. No.: 13/693,740

(22) Filed: Dec. 4, 2012

(65) Prior Publication Data

US 2013/0164542 A1 Jun. 27, 2013

Related U.S. Application Data

(63) Continuation of application No. 12/451,407, filed as application No. PCT/EP2008/055761 on May 9, 2008, now abandoned.

(30) Foreign Application Priority Data

May 10, 2007 (EP) .................... 07107968

(51) Int. Cl.
| | | |
|---|---|---|
| *B63B 3/14* | (2006.01) | |
| *B63B 59/04* | (2006.01) | |
| *B05D 1/38* | (2006.01) | |
| *B05D 3/06* | (2006.01) | |
| *B05D 7/16* | (2006.01) | |
| *B32B 15/08* | (2006.01) | |
| *B32B 15/082* | (2006.01) | |
| *B32B 15/09* | (2006.01) | |
| *B32B 15/092* | (2006.01) | |
| *B32B 15/095* | (2006.01) | |
| *B32B 15/18* | (2006.01) | |
| *B32B 27/16* | (2006.01) | |
| *B32B 27/20* | (2006.01) | |
| *C09D 5/00* | (2006.01) | |
| *B05D 7/00* | (2006.01) | |
| *C09D 5/08* | (2006.01) | |
| *C09D 7/12* | (2006.01) | |
| *C08K 3/22* | (2006.01) | |

(52) U.S. Cl.
CPC ............ *C09D 5/002* (2013.01); *B05D 7/54* (2013.01); *C09D 5/08* (2013.01); *C09D 7/1216* (2013.01); *B05D 3/065* (2013.01); *B05D 7/546* (2013.01); *C08K 3/22* (2013.01)

(58) Field of Classification Search
USPC .............. 428/413, 414, 416, 418, 423.1, 480, 428/500, 457, 458, 461; 427/327, 384, 427/385.5, 386, 388.1, 388.2, 402, 409, 427/410, 558

See application file for complete search history.

(56) References Cited

U.S. PATENT DOCUMENTS

| | | | |
|---|---|---|---|
| 3,717,509 A * | 2/1973 | Palm et al. ..................... 148/265 |
| 4,512,969 A | 4/1985 | Chang | |
| 2007/0077406 A1* | 4/2007 | Jacobs et al. ............... 428/304.4 |
| 2007/0167551 A1 | 7/2007 | Goodwin et al. | |

FOREIGN PATENT DOCUMENTS

| | | | | |
|---|---|---|---|---|
| CN | 1942532 | | 4/2007 | |
| EP | 0869156 A1 | | 12/1996 | |
| EP | 0750899 | | 5/1998 | |
| JP | 9228073 A | | 9/1997 | |
| JP | 10204335 A | * | 8/1998 | .............. C09D 5/16 |
| JP | 11092315 A | * | 4/1999 | ............. A01N 59/16 |
| JP | 11269837 A | | 10/1999 | |
| JP | 2000063733 A | * | 2/2000 | ........... C09D 127/16 |
| JP | 2001 152362 | | 6/2001 | |
| JP | 2001 212902 | | 8/2001 | |
| JP | 2001269581 A | * | 10/2001 | ............... B01J 29/06 |
| JP | 2002346393 A | | 12/2002 | |
| JP | 2005068521 A | | 3/2005 | |
| JP | 2006143815 A | | 6/2006 | |
| TW | I224615 | | 12/2004 | |
| WO | WO 02061005 A1 | | 8/2002 | |
| WO | WO 2007054304 A1 | * | 5/2007 | ........... C09D 163/00 |

OTHER PUBLICATIONS

Machine translation of JP 2001269581 A (no date).*
Machine translation of JP 2000063733 A (no date).*
Machine translation of JP 10204335 A, provided by the JPO website (no date).*
Machine translation of JP 11092315 A, provided by the JPO website (no date).*
Machine translation of JP 2006143815 A, provided by the JPO website (no date).*
Office Action issued Dec. 16, 2011 in connection with Chinese Patent Application 200880015498.1.

* cited by examiner

*Primary Examiner* — Michael J Feely
(74) *Attorney, Agent, or Firm* — Goodwin Procter LLP

(57) ABSTRACT

A primer coating composition for a metal substrate is described. The primer has a suitable binder and is characterized in that there is at least one semiconductor photocatalyst dispersed throughout the primer coating composition. A process of coating a metal substrate is also described. The invention extends to the use of a semiconductor photocatalyst as a top-coat to primer adhesion promoter or as a primer to top-coat delamination inhibitor in a primer coating composition.

20 Claims, No Drawings

PRIMER COMPOSITION

This is a continuation application of U.S. Patent Application Ser. No. 12/451,407, filed Nov. 10, 2009, which is a national phase filing of International Application No. PCT/EP2008/055761, which was filed on May. 9, 2008 and published in English on Nov. 20, 2008, and claims priority of European Patent Application No. 07107968.5, filed on May. 10, 2007, the entire contents of which are incorporated herein by reference.

The present invention relates to novel primer compositions, a novel process using such novel primers, use of semiconductor photocatalysts, a two layer coating system, and novel coated substrates.

Epoxy coatings such as those based on aromatic glycidyl ethers reacted with, for instance, polyamides, polyamines or polyamide adducts, the adducts being based on reaction products of glycidyl ethers and polyamines or polyamides, or epoxy coatings based on modified diglycidyl ethers of bisphenol A (DGEBA) e.g. fatty acid modified DGEBA, are typically used in protective coatings and marine coatings. Such coatings have strong adhesion to metal substrates and have good anti-corrosive properties as well as resistance to certain chemicals.

Applied primer coatings have both a minimum and maximum overcoating interval which depends upon the nature of the primer and the atmospheric conditions. The maximum overcoating time is the time allowed before unacceptable intercoat adhesion will take place. Exposure of the primer coating to atmospheric conditions, particularly sunlight, can reduce the maximum overcoating time and thus cause delamination. Extending the overcoating period would be advantageous, particularly in applications where primed components are left exposed for several months such as in block stage shipbuilding.

The delamination problems associated with UV exposure of epoxy based primer coatings have also led to the requirements of expensive alkali-cleaning and/or mechanical sanding of the epoxy top primer prior to overcoating with the top coat. Alternatively, a UV resistant upper layer may be applied at the block stage. Such a UV resistant layer is typically a polyurethane coating. The application of this UV resistant layer as the upper primer coat at the block stage is aimed at preventing delamination of the eventual top coat from the upper primer coat under wet conditions. However, the UV resistant polyurethane layer has poorer anti-corrosive properties than epoxy based primers so that it is not acceptable to apply a single polyurethane primer layer to the metal substrate prior to the top-coat just as it is not acceptable to apply a single epoxy primer layer in the block-stage followed by a top-coat in the hull stage. An inefficient system of at least 3 layers(epoxy primer, UV resistant polyurethane intermediate coat, and topcoat) is therefore employed.

Semiconductor photocatalysts are known and used in top-coats which require anti-fouling and ease of cleaning properties. They are also known in air purification applications. They have also been reported for potential use where electrical insulation by the top-coat is required (FATIPEC 2006 conference.VII.P-10 Manerov et al., INFLUENCE OF TITANIUM DIOXIDE ON THE HARDENING OF EPDXY OLIGOMERS WITH THE AMINE HARDENERS). The use of semiconductor photocatalysts such as photocatalytic metal oxides in primer coats is not known because primer coats being covered by a further coat, in use, do not require any antifouling, ease of cleaning or insulating properties.

The use of photocatalytic metals is known in compositions including non-primer coatings (Xiandai Tuliao Yu Tuzhuang (2006), 9(9), 12-13, Zeng, Fan-hui et. al.; CN 1743362A; JP2006143815 A2; Trends in Air Pollution Research (2005), Hidaka, Hisao et. al; KR 2003013139 A; and Materials Science (New York)(Translation of Fiziko-Khimichna Mekhanika Materialiv) (1999), 35(1), 125-128.

An object of the present invention is to overcome one or more of the above problems.

According to a first aspect of the present invention there is provided a primer coating composition for a metal, preferably steel, substrate comprising a suitable organic binder, characterised in that there is at least one semiconductor photocatalyst dispersed throughout the primer coating composition.

Preferably, an anticorrosion agent may also be present in the primer coating composition, at a suitable level, to prevent corrosion.

According to a second aspect of the present invention, there is provided a process of coating a metal, preferably steel, surface comprising the following steps:— a) applying a primer in accordance with the first aspect of the present invention to the metal substrate;
b) exposing the primer to UV radiation, preferably sunlight, to at least partially effect photocatalytic degradation of the organic binder;
c) optionally washing the surface of the exposed primer coat; and
d) applying a top-coat directly to the photocatalytically degraded and, optionally, washed primer coat surface.

According to a third aspect of the present invention there is provided use of a primer composition according to the first aspect of the present invention as a primer.

According to a fourth aspect of the present invention there is provided use of a semiconductor photocatalyst as a top-coat to primer adhesion promoter or as a primer to top-coat delamination inhibitor in a primer coating composition.

The semiconductor photocatalyst is typically in the form of particles, preferably, dispersed in the primer composition. The semiconductor may be selected from any semiconductor photocatalyst. Suitable semiconductor photocatalysts may be metal chalcogenides and conventional semiconductors. Suitable chalcogenides include photocatalytic metal oxides and photocatalytic metal sulphides Suitable photocatalytic metal oxides include for example, rutile $TiO_2$, anatase $TiO_2$, brookite $TiO_2$, amorphous $TiO_2$, strontium titanate ($SrTiO_3$), tin(IV) oxide ($SnO_2$), zinc(II) oxide (ZnO) ,iron(II) oxide (FeO), dibismuth trioxide ($Bi_2O_3$), copper(I)oxide ($Cu_2O$), Iron (III) oxide ($Fe_2O_3$), di-vanadium(V)pentoxide ($V_2O_5$), manganese dioxide ($MnO_2$), silver(I) oxide ($Ag_2O$), cadmium(II) oxide (CdO), indium(III) trioxide ($In_2O_3$) tungsten trioxide ($WO_3$) and tungsten dioxide ($WO_2$). Preferably, the photocatalytic metal oxide is selected from the group consisting of the aforementioned examples.

Suitable photocatalytic metal sulphides include copper (I) sulphide ($Cu_2S$), zinc sulphide (ZnS), indium sulphide ($In_2S_3$), lead sulphide (PbS), Molybdenum sulphide ($MoS_3$), antimony sulphide ($Sb_2S_3$) or ($Sb_3S_3$), bismuth sulphide ($Bi_3S_3$) or ($Bi_2S_3$), zinc cadmium sulphide ($ZnCdS_2$), tungsten sulphide ($WS_2$), cadmium sulphide (CdS).

Other suitable photocatalytic metal chalcogenides include other, typically binary, metal compounds of group 16 chalcogens such as tungsten selenide ($WSe_3$), lead selenide (PbSe), cadmium selenide (CdSe), indium selenide ($In_2Se_3$), and cadmium telluride (CdTe).

Sutable conventional semiconductors which can act as photocatalysts include gallium arsenide (GaAs), silicon (Si), selenium (Se), Cadmium phosphide ($Cd_2P_3$)and zinc phosphide ($Zn_2P_3$).

Preferably, the semiconductor photocatalyst is anatase $TiO_2$.

A single semiconductor photocatalyst or a mixture of any two or more semiconductor photocatalysts may be selected. Preferred semiconductor photocatalysts are chemically and biologically inert, readily available and simple to use. It is especially preferred that the semiconductor photocatalyst is activated by sunlight.

A preferred group of photocatalysts is the photocatalytic metal oxides, more preferably, a metal oxide selected from zinc (II) oxide or a $TiO_2$. If $TiO_2$ is selected a single form of $TiO_2$ or a mixture of forms thereof may be selected. Anatase-type titanium oxide $TiO_2$ or an anatase/rutile mix is more preferred. Anatase-type titanium oxide $TiO_2$ is most preferred. A suitable example of the anatase/rutile mix which is readily commercially available, harmless and chemically stable is Degussa P25, a finely divided material, 50 $m^2g^{-1}$, containing a 70:30 ratio of anatase to rutile.

Other examples of suitable Anatase type $TiO_2$ are PC-105 (from Millenium Inorganic Chemicals), Tronox AK-1 and Tronox 8652 (from Tronox Inc); and the anatase products of the Sirius Luster Pearl series—S1120, 51200, 51210 and S1220 (from Novant Chemicals, a member of the Noble Group). These Luster Pearl series forms are based on a thin layer of anatase type $TiO_2$ on mica. Accordingly, the invention should be understood to extend to incorporating the at least one semi-conductor photocatalyst on a suitable substrate such as mica.

The anatase form requires higher light energy than the rutile form, but shows a stronger photoactivity. This can be explained with the longer lifetime of the excited state in anatase and the better adsorption of oxygen in anionic form at the anatase surface.

Without being bound by theory, the photocatalytic reaction most likely occurs on the surface of the metal oxide particles. Accordingly, a small particle size is preferred. However, the smaller the particle size, the greater the difficulty in dispersing the particles. Accordingly, a particle size balance needs to be found which provides suitable dispersion and sufficient photocatalytic activity.

Preferably, the average particle size of the semiconductor photocatalyst is in the range 0.01 to 100 µm more preferably 0.05 to 10 µm, most preferably, 0.05 to 5 µm. A nanosized range is also possible such as 1-800nm.

Suitable binders according to the present invention are organic binders. Preferably, the primer coating may be based on any suitable organic coating binder such as alkyd, polyester, polyurethane, acrylic or epoxy, preferably, however, it is an epoxy based primer composition.

For the avoidance of doubt, references to primer should be taken to include other pre-top-coat coatings including build coat(s), intermediate coat(s) or tie coat(s).

Preferably, the primer includes suitable additives known to those skilled in the art including suitable pigments.

Surprisingly, the period of time which elapses between step b) and c) or d) in the second aspect of the present invention can be prolonged by using the primer coating compositions of the present invention and this still results in satisfactory primer to overcoat adhesion. This is surprising because the exposure of the semiconductor photocatalyst to UV radiation will result in catalytic degradation of the binder so improvements in an essential property of the primer ie. overcoat adhesion were not expected.

Advantageously, by the use of the primer of the invention, a metal substrate such as the hull of a ship can be coated with primer and top-coat independent of the interval between the application of the two coatings i.e. the UV exposure, and independent of the exposure of these coatings to water immersion. A particular advantage of the present invention is the application of the primer composition in the "block-stage" of a new ship and a polyurethane or epoxy top-coat in the hull stage without expensive surface cleaning and/or mechanical sanding or additional application of UV protective coatings over the corrosion resistant primer prior to top-coat application. The longer intercoat interval allows the project engineer the maximum flexibility when scheduling on-site painting activities.

Preferably, the semiconductor photocatalyst in the composition is in the range 1-40% w/w total dry composition, more preferably, 1-30% w/w total dry composition, especially 5-30% w/w or 10-30% w/w total dry composition.

In addition to the semiconductor photocatalyst, additional components may assist in the process of the invention. For instance, further improvements in properties such as overcoating adhesion have been found with the concomitant use of zirconium compounds. Preferably, one or more zirconium compounds, such as zirconium oxide(s) are present, preferably, are dissolved in a solvent of the composition. The amount of zirconium compound in the composition is typically in a similar range as the semiconductor photocatalyst, for example in a ratio of zirconium compound: semiconductor photocatalyst between 1:100 and 3:1, more typically between the range of 1:10 and 2:1, most typically between the range of 1:5 and 1:1 w/w.

The use of semiconductor photocatalysts is known in the field of self-cleaning coatings because of its anti-fouling and ease of cleaning properties. Accordingly, semiconductor photocatalysts are known in top-coats which require anti-fouling and/or ease of cleaning properties. To date the use of photocatalytic materials in primer coats is unknown because such coats, not being top coats, do not need anti-fouling or self-cleaning properties.

Therefore, according to a further aspect of the present invention there is provided a coated substrate comprising a metal substrate, an initial primer coat according to the first aspect of the present invention and located on the substrate and at least one top coat. The top coat may not be the same as the primer coat and is preferably a coating having a different composition. Suitable top coats will be known to the skilled person.

According to a still further aspect of the present invention, there is provided a coated substrate comprising a substrate and a series of coatings on at least one surface of the substrate including one or more inner coatings and an outer coating, at least one of the said inner coatings being in accordance with the first aspect of the present invention.

Preferably, the primer composition of the present invention includes a suitable solvent.

Typically, the primer composition of the present invention is substantially free from water repellent fluororesins.

Suitable additives in the primer coats of the present invention include:— auxiliaries or additives such as solvents, colorants, mineral oils, fillers, elastomers, antioxidants, stabilizers, defoamers, extenders, plasticizers, catalysts, pigments, pigment pastes, reinforcing agents, flow control agents, thickening agents, flame-retarding agents, additional hardeners and additional curable compounds, depending on the application.

Curing of the composition according to the invention, where necessary, typically proceeds very rapidly, and in general can take place at a temperature within the range of from −10° C. to +50° C., in particular from 0° C. to 40° C., more in particular from 3° C. to 20° C.

Other Components

Any solvents used in the present invention are those which are capable of dissolving the binder and any curing agents. Examples include hydrocarbons such as toluene or xylene, ethers such as diethylether, chlorinated hydrocarbons such as dichloromethane or tetrachloromethane, alcohols such as isopropyl alcohol, ketones such as methylethylketone, esters such as ethyl acetate, etc. The amount of solvent depends on the application but, when present, is typically in a ratio of between 1:5 to 10:1 by weight with respect to the epoxy resin and curing agent. Solvent free epoxy primers are also envisaged.

For corrosion-resistant primers specific pigments known in the art of anti-corrosion coatings may be used. For instance, various rust-proofing pigments may be used. Examples of extenders include general inorganic fillers (talc, aluminium silicates, etc). Example pigments include zinc powder (Zn), zinc phosphate, and aluminium powder (Al).

Other pigments that may be used include micacious iron oxide (MIO) and glass flakes. Catalysts for epoxy resins can be tertiary amines. Phenols and salicylic acid can also be used as a curing catalyst. Various other curing catalysts are known to the skilled person such as those disclosed in FATIPEC 2006 conference.VII.P-10 Manerov et al., INFLUENCE OF TITANIUM DIOXIDE ON THE HARDENING OF EPDXY OLIGOMERS WITH THE AMINE HARDENERS.

Examples of additives include anti-sagging and anti-settling agents, anti-floating/anti-flooding agents, anti-foaming and anti-popping agents, levelling agents, and matting agents. An example of an anti-sagging/anti-settling agent is an aliphatic bis-amide thixotropic agent. An example of an anti-floating/anti-flooding agent is an aliphatic polyhydric carboxylic acid with added silicone. An example of an anti-foaming/anti-popping agent is a specialty vinyl polymer (such agents are available from Kusumoto Chemicals, Ltd and include Disparlon 6900-20X, Disparlon 2100 and Disparlon 1950 respectively).

The primer composition of the present invention that is epoxy based can be manufactured in similar manner to an ordinary coating material based on an epoxy resin. That is to say, all the constituents other than the curing agent, are mixed with the epoxy resin to form a coating solution; the curing composition alone, or diluted with a solvent or the like, is used as the curing composition; and base coating solution and curing composition are mixed immediately before use. In other words, the composition of the present invention can be prepared as a so-called two-pack coating material. The semiconductor photocatalyst is, preferably, present in a base coating prior to mixing with the curing agent. Accordingly, in a further aspect of the present invention there is provided a pre-cured, preferably, epoxy resin based, primer composition for a metal, preferably, steel, substrate comprising a suitable organic binder, characterised in that there is at least one semiconductor photocatalyst dispersed throughout the pre-cured primer coating composition.

As noted above, when a two-pack coating system is adopted, the pre-cured epoxy resin based composition and the curing composition are mixed immediately before the coating is to be applied. Coating application can be carried out by ordinary application methods such as brush, roller or spray. Coating application is carried out within a usable time interval after the coating solution and the curing agent have been mixed. The usable time is generally 30 minutes (or less in case of polyurea based primers) to 8 hours, and in the case of a solvent type coating material is from 3 to 8 hours. Drying is generally carried out at ordinary temperature, and drying time is generally from 8 to 24 hours.

The method of applying a corrosion and UV-resistant coating according to the present invention is a method wherein a topcoat is formed after at least one primer layer has been formed on the object being coated. A distinguishing feature of this method is that the topmost surface of the primer layer is formed using the above-described primer composition of the invention.

Note that the rust preventive coating, primer coating, etc. may be applied to the surface of the object to be coated. In the method of applying a corrosion and UV-resistant coating according to the present invention, at least the topmost coating of the primer layer(s) is formed by applying the above-described primer composition of the invention. The thickness of the coating film formed by application of this primer composition will vary according to the intended use, etc., but is typically 30 to 800 μm in terms of dried film thickness, more typically, 30-400, most typically, 50-250 μm. As noted above, drying is generally carried out at ordinary temperature and drying time is a few seconds to 24 hours.

The primer may be applied as multiple layers. It is therefore also possible to give the primer a laminated structure by applying the composition of the present invention a plurality of times so that there are multiple layers. There is no particular restriction on the quantity of coating applied each such time, but the coating material is generally applied so as to give the aforementioned dried film thickness of 10 to 500 μm per layer.

A topcoat that is typically used after the application of corrosion-resistant coatings can be used as the topcoat formed on a topmost primer layer that has been formed in the manner described above. For example, a conventional topcoat material can be used over the coating material used as the primer layer. Specific examples of topcoat binder materials include those used in oil-based coatings and those based on long-oil phthalic acid resins, silicone alkyd resins, phenol resins, chlorinated rubber resins, epoxy resins, modified epoxy resins, tar epoxy resins, vinyl chloride resins, 2K polyurethanes, polyurea resins, fluorine resins, and silicone modified resins. Acrylic resin or vinyl resin "antifouling coatings", which hinder the adhesion of organisms, may be used as functional coating materials. Among such coating materials, epoxy resins, polyurethane resins, alkyd resins and acrylic resins are particularly advantageous. Preferably, the top-coat is non-fused i.e. not applied by the application of heat to for instance a powder coating.

For the avoidance of doubt, references to "top coat, over coat or the like" herein are references to the coat applied directly (i.e. without an intermediary layer) over the topmost primer composition coating and not the top-primer coat or a build coat unless indicated otherwise.

The dried film thickness of the topcoat is typically 20 to 2000 μm per layer, more typically, 20-500μm, most typically, 50-250 μm. Drying is generally carried out at ordinary temperature, and drying time is a few seconds to 24 hours. As in the case of the primer layer, the topcoat may also be applied as multiple layers.

The present invention enables the time interval between formation of the topmost primer layer and application of the topcoat to be lengthened. The detailed reasons for this are not clear, but it is clear that adding the semiconductor photocatalyst results in improved adhesion vis-à-vis the topmost primer layer-adjacent topcoat layer interface even when the overcoating interval is lengthened.

The coating material composition of the present invention gives excellent adhesion vis-à-vis a topcoat layer when used as the primer layer in the application of corrosion and UV-resistant coatings. In particular, because the time interval from formation of the primer layer to application of the topcoat can be lengthened, there is a greater degree of freedom in topcoat application than hitherto. Accordingly, the present invention will be particularly useful in the application of corrosion-resistant coatings on large structures such as ships.

Suitable primer binders for the present invention will be known to those skilled in the art of primer coat technology. As mentioned above, a preferred binder resin is an epoxy based resin.

A detailed list of suitable epoxide compounds can be found in the handbooks A. M. Paquin, "Epoxidverbindungen and Harze" (Epoxide Compounds and Resins), Springer Verlag, Berlin 1958, Chapter IV and H. Lee and K. Neville, "Handbook of Epoxy Resins" MC Graw Hill Book Company, New York 1982 Reissue, as well as C. A. May, "Epoxy Resins-Chemistry and Technology", Marcel Dekker, Inc. New York and Basle, 1988.

Suitable epoxy resin curing agents include polyamines and polyamides. These compounds are part of the general state of the art and are described, inter alia, in Lee & Neville,"Handbook of Epoxy Resins", MC Graw Hill Book Company, 1987, chapter 6-1 to 10-19.

Suitable epoxy based top-coats for the present invention may be based on the epoxy resin primer formulations detailed above with suitable topcoat additives known to the skilled person such as colour pigment and gloss additives.

Polyurethane Based Topcoats

Suitable polyurethane resin based topcoats are described in Chapter 16 of "Protective Coatings Fundamentals of Chemistry and Composition", Hare, Pittsburgh, 1994, the contents of which are incorporated herein by reference.

The polyurethane top-coats useful in combination with the primer of the present invention are typically two pack curing type polyurethane coating compositions derived from the combination of suitable polyols and isocyanates known to the skilled person.

Typically, the top-coat or overcoat of the present invention is not a polyamide based coating. For the avoidance of doubt, the term polyamide based coating does not extend to coatings based on other resins but which contain polyamide such as polyamide cured epoxy resins.

Alkyd Resin Based Topcoats

Suitable alkyd resin based topcoats are described in Chapter 12 of "Protective Coatings Fundamentals of Chemistry and Composition", Hare, Pittsburgh, 1994, the contents of which are incorporated herein by reference.

Epoxy ester Based Topcoats

Alkyd similar epoxy ester based topcoats may also be used. These are similar to the alkyds mentioned above except that the presence of a polybasic acid is not essential and typically, the epoxy-based resin is reacted with the fatty acid oil or (meth)acrylic acid to produce the ester linkage.

Acrylic Resin Based Topcoats

Suitable acrylic resin based topcoats are described in Chapter 8 of "Protective Coatings Fundamentals of Chemistry and Composition", Hare, Pittsburgh, 1994.

Pigments, solvents and additives for all the topcoats are well known in the art.

Optionally, further topcoat layers can be applied to produce a multi-layer top-coat.

The primer coating compositions of the invention exhibit improved primer to top-coat delamination inhibition and/or adhesion. By improved in this context is typically meant having suitability for an increased, for instance, longer than 50 day, overcoating interval.

Typically, the overcoating interval i.e. the interval of time between applying the topmost primer layer composition of the invention and at least the initial top-coat is at least 10 days, more typically, more than 30 days, most typically more than 50 days. Typically, the overcoating interval is 10-500 days, more typically, 20-400 days, most typically, 30-300 days, especially 60-300 days.

Advantageously, the primer coating of the present invention is not necessarily treated with alkaline and/or sanding techniques.

The compositions according to the invention can find various industrial applications because of their favourable anti-delamination and anti-corrosive properties. Typical industrial applications for the compositions of the invention include, for example, use for the production of coatings and/or intermediate coatings on many types of metal substrates, for example, sheet steel, cast iron, aluminium and nonferrous metals, such as brass, bronze and copper. In particular, the compositions of the invention can be used as paints and coatings for coating industrial objects and, in particular, in the shipbuilding industry for ships hulls, including blocks for shipbuilding. In the latter case, blocks may be for hulls or other components such as ballast tanks.

The compositions can be applied, for example, by brushing, rolling, spraying, dipping and the like.

The invention also extends in a further aspect to a two layer coating system for a metal substrate such as a ship's hull comprising, preferably, consisting of, a first primer coat according to any of the above aspects of the invention and a second top-coat wherein the top coat is either:—
  a) an epoxy based top coat,
  b) a polyurethane based top coat,
  c) an alkyd/polyester resin based top coat, or
  d) an acrylic resin based top coat.

The preferred features of this further aspect of the invention are those already defined for the earlier aspects.

The invention will be more readily understood by reference to the following examples and figures, which are included merely for purposes of illustration of certain aspects and embodiments of the present invention and are not intended to limit the invention.

EXAMPLES

Paint preparation:

Two different base compositions were prepared. Base A and Base B had identical compositions (see table 1) except Base A included approx 30% w/w of the selected semiconductor photocatalyst in place of an equivalent weight of talc (Westmin D50-E).

TABLE 1

|  | Base A | Base B |
| --- | --- | --- |
| Epikote 828(epoxy resin) | 470 g | 470 g |
| Nonylphenol | 30 g | 30 g |
| Thixotropic agent (Nebothix C668.90X (from Necarbo) | 34 g | 34 g |
| Xylene | 140 g | 140 g |
| Isobutanol | 30 g | 30 g |
| Semiconductor Photocatalyst | 600 g | — |
| Westmin D50-E | 650 g | 1250 g |

EPIKOTE is a trade mark of Resolution Performance Products

Westmin is a trade name of Mondo Minerals BV.

Nebothix is a trade mark of Necarbo B.V.

Byk is a trade mark of Byk Chemie

Each of the above compositions were mixed until homogenous and then milled at 65° C. under vacuum. To each of these mixtures was then added 6 g Byk 300 (a surface additive available from Byk Chemie) to give a total base composition weight of 1960 g in each case.

The hardener (SigmaShield 220/420 hardener, available from SigmaKalon Marine and Protective Coatings B.V.) is then added to the base when ready. The hardener is added at 86/14 wt/wt mixing ratio base/hardener.

The semiconductor photocatalysts tested were:—.

Serena Zinc Oxide (Umicore)

Titanium oxide Anatase modification

Hombitan LW (Sachtleben)

Tioxide AHR (Huntsman)

Hombikat UV 100 (Sachtleben)

Serena is a trade name of Umicore

Hombitan LW and Hombikat UV 100 are trade names of Sachtleben

Tioxide AHR is a trade name of Huntsman Tioxide

Exposure and Testing.

Panels are prepared by air spraying approximately 250 μm thick layers of the primer onto an SA 2.5 grit blasted steel panel. Three primers are mixed with hardener and coated onto the steel substrate corresponding to Base B, a 50:50 wt/wt mix of Base A and Base B and Base A. Accordingly, three levels are tested: 0% semiconductor photocatalyst, 15% semiconductor photocatalyst and 30% semiconductor photocatalyst in each case. For each primer coating, 6 panels were prepared so that there were 6 panels for each of the 9 primers (4 primers @ 30%; 4 primers @ 15%; and 1 primer @ 0%) ie. 54 panels in total. Each of the 9 primer formulations was subsequently tested with overcoats after each of 6 exposure periods.

Specifically, after curing, the 54 panels were placed at the outdoor exposure field according to ISO 2810 starting in January.

After 3 months exposure, 4 months exposure, and 8 months exposure one of the panels coated with each primer was removed from the field. The three remaining panels for each of the 9 primers were tested after longer periods of exposure.

The dirt and loosely adhering material was washed away using a soft sponge. After 24 hours drying each of the panels was recoated by brush with the following commercial products from SigmaKalon:

Sigmashield™ 420 LT (a high solids epoxy coating)

Sigma Aquacover™ 400 (a water based epoxy coating)

Sigmaguard™ 425 (a solvent free epoxy coating)

Sigmarine™ 48 (an alkyd coating)

Sigma Vikote™ 75 (a solvent based acrylic coating)

Sigmadur™ 1800 (a polyurethane top coating)

so that 6 overcoated sections were found on each panel.

After curing for 7 days, the dry intercoat adhesion was determined. Immediately after this determination the panels were exposed to tap water for 14 days, after which the wet adhesion is determined.

Adhesion, was determined using ASTM D 3359 with the following classification: 0=very poor (complete detachment) up to 5=excellent (no detachment). Accordingly, each overcoated panel underwent a dry and wet adhesion test on each overcoated area corresponding to the six overcoats.

The aggregate results are shown in Table 2.

TABLE 2

Sorted aggregate results on score of dry and wet adhesion. The highest score is given the best overall adhesion score. (maximum 180).

| Metal oxide and test level | total dry adhesion | total wet adhesion |
|---|---|---|
| Tioxide AHR - 30% | 166 | 163 |
| Hombitan LW - 15% | 156 | 159 |
| Serena ZnO - 30% | 160 | 151 |
| Hombitan LW - 30% | 162 | 149 |
| Hombikat UV 100 - 30% | 141 | 129 |
| Tioxide AHR - 15% | 150 | 124 |
| Serena ZnO - 15% | 129 | 107 |
| HombikatTM UV100 - 15% | 122 | 97 |
| none (Primer B) | 63 | 23 |

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coated metal substrate comprising a primer coat directly on the metal substrate and at least one top-coat directly on the primer coat; wherein the primer coat consists of at least one primer layer, the at least one primer layer comprising an anatase $TiO_2$ semiconductor photocatalyst dispersed in a suitable organic binder; wherein the binder is at least partially degraded by the anatase $TiO_2$ semiconductor photocatalyst; and wherein the at least one top-coat has a different composition than the primer coat.

2. The coated metal substrate of claim 1, wherein the at least one top-coat is selected from:

a) an epoxy based top-coat, b) a polyurethane based top-coat, c) an alkyd/polyester resin based top-coat, and d) an acrylic resin based top-coat.

3. The coated metal substrate of claim 1, wherein the at least one top-coat comprises a semiconductor photocatalyst dispersed in a suitable organic binder.

4. The coated metal substrate of claim 1, wherein the metal substrate is a steel substrate.

5. The coated metal substrate of claim 1, wherein the anatase $TiO_2$ semiconductor photocatalyst is in the form of particles.

6. The coated metal substrate of claim 1, wherein the anatase $TiO_2$ semiconductor photocatalyst is present in the primer coat in an amount of 1-40% w/w of total dry weight of the primer coat.

7. The coated metal substrate of claim 1, wherein the organic binder is selected from alkyd, polyester, urethane, acrylic and epoxy resin binder.

8. The coated metal substrate of claim 1, wherein the primer coat further comprises an additional ingredient selected from the group consisting of a solvent, a colorant, a mineral oil, a filler, an elastomer, an antioxidant, a stabilizer, a defoamer, an extender, a plasticizer, a catalyst, a pigment, a pigment paste, a reinforcing agent, a flow control agent, a thickening agent, a flame-retarding agent, a hardener, and a curable compound.

9. The coated metal substrate of claim 1, wherein the metal substrate is a ship's hull.

10. A process of coating a metal substrate comprising the following steps:
   a) applying a primer coat directly to the metal substrate, the primer coat consisting of at least one primer layer, the at least one primer layer comprising an anatase $TiO_2$ semiconductor photocatalyst dispersed in a suitable organic binder;
   b) exposing the primer coat to UV radiation to at least partially effect photocatalytic degradation of the organic binder;
   c) optionally washing an exposed surface of the primer coat; and
   d) applying at least one top-coat directly to the exposed surface of the primer coat, the at least one top-coat having a different composition than the primer coat.

11. The process according to claim 10, wherein the at least one top-coat is selected from:
   a) an epoxy based top-coat,
   b) a polyurethane based top-coat,
   c) an alkyd/polyester resin based top-coat, and
   d) an acrylic resin based top-coat.

12. The process according to claim 10, wherein the at least one top-coat comprises a semiconductor photocatalyst dispersed in a suitable organic binder.

13. The process of claim 10, wherein the metal substrate is a steel substrate.

14. The process of claim 10, wherein the anatase $TiO_2$ semiconductor photocatalyst is in the form of particles.

15. The process of claim 10, wherein the anatase $TiO_2$ semiconductor photocatalyst is present in the primer coat in an amount of 1-40% w/w of the total dry weight of the primer coat.

16. The process of claim 10, wherein the organic binder is selected from alkyd, polyester, urethane, acrylic and epoxy resin binder.

17. The process of claim 10, wherein the primer coat further comprises an additional ingredient selected from the group consisting of a solvent, a colorant, a mineral oil, a filler, an elastomer, an antioxidant, a stabilizer, a defoamer, an extender, a plasticizer, a catalyst, a pigment, a pigment paste, a reinforcing agent, a flow control agent, a thickening agent, a flame-retarding agent, an additional hardener and an additional curable compound.

18. The process according to claim 10, which results in improved adhesion of the top-coat to the primer coat.

19. The process of claim 10, wherein the UV radiation is sunlight.

20. The process according to claim 10, wherein step (b) lasts for an interval of 10-500 days before applying the top-coat in step (d).

* * * * *